(12) United States Patent
Blevins, Sr.

(10) Patent No.: US 7,437,605 B2
(45) Date of Patent: Oct. 14, 2008

(54) HOT STANDBY METHOD AND APPARATUS

(75) Inventor: Joseph S. Blevins, Sr., Millersville, MD (US)

(73) Assignee: Union Switch & Signal, Inc., Pittsburgh, PA (US)

( * ) Notice: Subject to any disclaimer, the term of this patent is extended or adjusted under 35 U.S.C. 154(b) by 816 days.

(21) Appl. No.: 10/526,951

(22) PCT Filed: Sep. 9, 2003

(86) PCT No.: PCT/US03/28149

§ 371 (c)(1),
(2), (4) Date: Mar. 8, 2005

(87) PCT Pub. No.: WO2004/025469

PCT Pub. Date: Mar. 25, 2004

(65) Prior Publication Data

US 2007/0168710 A1  Jul. 19, 2007

Related U.S. Application Data

(60) Provisional application No. 60/409,425, filed on Sep. 10, 2002.

(51) Int. Cl.
*G06F 11/00* (2006.01)
(52) U.S. Cl. .......................... 714/11; 714/12
(58) Field of Classification Search ............ 714/10, 714/11, 12
See application file for complete search history.

(56) References Cited

U.S. PATENT DOCUMENTS

| | | | |
|---|---|---|---|
| 4,181,945 A | 1/1980 | Adler et al. | |
| 4,610,013 A * | 9/1986 | Long et al. | 714/11 |
| 5,301,906 A | 4/1994 | Bodnar, II | |
| 5,751,569 A | 5/1998 | Metel et al. | |
| 5,794,167 A | 8/1998 | Gruere et al. | |
| 5,890,003 A * | 3/1999 | Cutts et al. | 710/263 |
| 6,023,772 A | 2/2000 | Fleming | |
| 6,202,170 B1 | 3/2001 | Busschbach et al. | |
| 6,281,606 B1 | 8/2001 | Westlake | |
| 6,449,733 B1 | 9/2002 | Bartlett et al. | |

(Continued)

FOREIGN PATENT DOCUMENTS

WO    WO2004025469 A1 *  3/2004

*Primary Examiner*—Marc Duncan
(74) *Attorney, Agent, or Firm*—Kirk D. Houser; Eckert Seamans Cherin & Mellott, LLC

(57) ABSTRACT

An apparatus provides hot standby operation with normal and standby processors, each of which includes vital inputs electrically interconnected with the vital inputs of the other processor, vital outputs, and an application routine inputting the vital inputs and outputting the vital outputs. Communication ports communicate with communication ports of the other processor. A health routine provides a health status after communication is established with the other processor. A vital relay includes an input controlled by a vital output and an output to a vital input of the other processor. A synchronization routine provides a synchronization status through the communication ports. The application routine outputs the vital outputs when the synchronization status is set. The standby processor includes a reset routine, which resets the standby processor when the health status of that processor is not provided. A vital "OR" circuit outputs from the vital outputs of the normal and standby processors.

47 Claims, 2 Drawing Sheets

U.S. PATENT DOCUMENTS

| | | |
|---|---|---|
| 6,496,940 B1 | 12/2002 | Horst et al. |
| 6,981,176 B2 * | 12/2005 | Fruehling et al. ............. 714/11 |
| 2001/0032908 A1 * | 10/2001 | Anderson et al. ........... 246/124 |
| 2002/0096604 A1 * | 7/2002 | Hager et al. ................. 246/220 |
| 2006/0150004 A1 * | 7/2006 | Mizutani ..................... 714/11 |

* cited by examiner

HOT STANDBY METHOD AND APPARATUS

CROSS REFERENCE TO RELATED APPLICATION

This application claims the benefit of U.S. Provisional Application Ser. No. 60/409,425, filed Sep. 10, 2002.

REFERENCE TO COMPUTER PROGRAM LISTING APPENDIX

A computer program listing including details of example test programs illustrating various routines employed by the normal processor unit and the standby processor unit in embodiments of the present invention has been submitted herewith on one compact disc and one duplicate copy thereof. The materials are incorporated by reference herein in accordance with 37 CFR § 1.52(e)(5). The compact disc contains three files: (1) named "appenda.asc", created on Feb. 18, 2005, file size 26,805 bytes; (2) named "appendb.asc", created on Feb. 18, 2005, file size 217,495 bytes; and (3) named "appendc.asc", created on Feb. 18, 2005, file size 25,277 bytes.

BACKGROUND OF THE INVENTION

1. Field of the Invention

The invention relates to apparatus including normal and standby processors and, more particularly, to such apparatus providing hot standby operation. The invention also relates to a method for providing hot standby operation with normal and standby processors.

2. Background Information

U.S. Pat. No. 5,794,167 discloses a rail transport microprocessor based reliability system for monitoring and controlling actuators as a function of data supplied by sensors. The system includes at least two parallel microprocessors handling the same application. The microprocessors receive pre-encoded data from the sensors and microprocessor output data. A third, comparison microprocessor, known as a voter, employs software to compare the encoded characteristic results of the respective parallel microprocessors.

U.S. Pat. No. 4,181,945 discloses a high-reliability vehicle control system including two redundant computer systems. Each of the computer systems consists of two computers, which compare their results and deliver them only if they agree. Which one of the two computer systems processes telegrams received from a control center and compiles telegrams to the control center from messages of on-board units is determined from the control center. At regular intervals, switchover to the other computer system is effected to check whether the latter is functioning correctly or not.

U.S. Pat. No. 6,281,606 discloses a plural output electric train control station, which employs a data processor for monitoring and controlling signals generated at a plurality of transformer-driven power output terminals.

U.S. Pat. No. 5,751,569 discloses a method of controlling railroad train movement over a layout of railroad track, which is defined geographically using a linear network of geographic control objects. A train control process may be distributed (e.g., not requiring a single central processing unit) and lends itself to localized testing when a failed hardware module is replaced, as only the function performed by that module need be tested.

U.S. Pat. No. 5,301,906 discloses an Interlocking Control System (ICS), such as the Microlok® railroad interlocking control system for railroad switching and signaling. A signal to move a switch to its normal position, for example, may be produced in three controllers. Input/output signals regarding entrance and exit locations in a shared territory are transferred between a control console and a terminal block over a data communication link. This information is further transferred in parallel fashion between the controllers and terminal block over respective data communication links. Signals to and from the field are respectively transferred in parallel fashion between the controllers and the terminal block over respective data communication links. Signals output from the controllers are respectively fed via lines to common connection at a node. Interposing diodes are provided to prevent undesired backfeed. A similar terminal connection is employed for outputting a common signal to the three controllers.

There is room for improvement in apparatus and methods for providing hot standby operation with normal and standby processors.

SUMMARY OF THE INVENTION

This need and others are met by the present invention. Many of the past hindrances to develop a hot standby Microlok® have been due to an inability to remain focused on the fundamental reason for a hot standby. A hot standby is for the purpose of having hardware backup not logic backup. Since one Microlok® unit is capable of providing failsafe operation, an additional unit is not for the purpose of making the system more failsafe, it is simply providing a backup system that can be utilized until a maintainer can be dispatched to repair the hardware of the primary unit.

In accordance with one aspect of the invention, an apparatus for providing hot standby operation comprises: a normal processor; a standby processor; each of the normal and standby processors comprising: a plurality of vital inputs, at least some of the vital inputs being electrically interconnected with at least some of the vital inputs of the other one of the standby and normal processors, a plurality of vital outputs, means for communicating with the other one of the standby and normal processors, a health routine providing a health status after communication is established with the other one of the standby and normal processors through the means for communicating, a vital relay including an input controlled by one of the vital outputs and an output to one of the vital inputs of the other one of the standby and normal processors, a synchronization routine providing a synchronization status through the means for communicating with the other one of the standby and normal processors, and an application routine outputting the vital outputs when the synchronization status is set and inputting the vital inputs; the standby processor further comprising a reset routine, which resets the standby processor when the health status of the standby processor is not provided; and means for outputting from some of the vital outputs of the normal processor and from some of the vital outputs of the standby processor.

The normal and standby processors may operate in at least one mode selected from the group comprising: a first mode wherein both of the normal and standby processors output through at least one of the some of the vital outputs of the normal and standby processors, respectively, without restriction; a second mode wherein the normal processor outputs through at least one of the some of the vital outputs of the normal processor without restriction and the standby processor verifies through the means for communicating of the standby processor that the standby processor agrees with the normal processor before outputting through at least one of the some of the vital outputs of the standby processor and, otherwise, the standby processor being reset; and a third mode wherein both of the normal and standby processors verify through the means for communicating of the normal and standby processors, respectively, that the normal and standby processors, respectively, agree with the standby and normal processors, respectively, before outputting through at least one of the some of the vital outputs of the normal and standby processors, respectively, and, otherwise, the normal and standby processors being reset.

The normal and standby processors may operate in modes wherein the normal processor outputs through at least one of the some of the vital outputs of the normal processor without restriction and the standby processor verifies through the means for communicating of the standby processor that the standby processor agrees with the normal processor before outputting through at least one of the some of the vital outputs of the standby processor and, otherwise, the standby processor being reset.

The means for outputting may include a vital OR circuit having a first input from one of the some of the vital outputs of the normal processor, a second input from one of the some of the vital outputs of the standby processor, and an output adapted to output to a single output device.

The health routine of the normal and standby processors may periodically exchange health information with the health routine of the standby and normal processors, respectively, in order to provide the health status when the one of the vital inputs of the other one of the standby and normal processors is set and the health information is periodically received.

In accordance with another aspect of the invention, a hot standby method comprises: employing a normal processor; employing a standby processor; with each of the normal and standby processors: employing a plurality of vital inputs, electrically interconnecting at least some of the vital inputs with at least some of the vital inputs of the other one of the standby and normal processors, employing a plurality of vital outputs, communicating with the other one of the standby and normal processors, providing a health status after communication is established with the other one of the standby and normal processors, employing a vital relay including an input controlled by one of the vital outputs and an output to one of the vital inputs of the other one of the standby and normal processors, providing a synchronization status associated with the communicating with the other one of the standby and normal processors, and employing an application routine for outputting the vital outputs when the synchronization status is set and inputting the vital inputs; employing with the standby processor a reset routine, which resets the standby processor when the health status of the standby processor is not provided; and outputting from some of the vital outputs of the normal processor and from some of the vital outputs of the standby processor.

In accordance with another aspect of the invention, a method for providing normal and standby processors comprises: employing a normal processor; employing a standby processor; with each of the normal and standby processors: employing a plurality of vital inputs, electrically interconnecting at least some of the vital inputs with at least some of the vital inputs of the other one of the standby and normal processors, employing a plurality of vital outputs, communicating with the other one of the standby and normal processors, providing a health status after communication is established with the other one of the standby and normal processors, employing a vital relay including an input controlled by one of the vital outputs and an output to one of the vital inputs of the other one of the standby and normal processors, providing a synchronization status associated with the communicating with the other one of the standby and normal processors, and employing an application routine for outputting the vital outputs when the synchronization status is set and inputting the vital inputs; employing with the standby processor a reset routine, which resets the standby processor when the health status of the standby processor is not provided; outputting from some of the vital outputs of the normal processor and from some of the vital outputs of the standby processor; and disabling the some of the vital outputs of the standby processor if the output of the vital relay of the normal processor is set.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The method and apparatus disclosed herein is applied to an Interlocking Control System (ICS), such as the Microlok® railroad interlocking control system for railroad switching and signaling, as described in U.S. Pat. No. 5,301,906, which is hereby incorporated herein by reference. Although Microlok® units are disclosed, the invention is applicable to other ICS signal equipment, railway control circuitry, railway signaling, and railway logic devices, such as, for example, a Microlok® II Wayside Control System marketed by Union Switch & Signal, Inc. of Pittsburgh, Pa.

EXAMPLE 1

Figure 1:
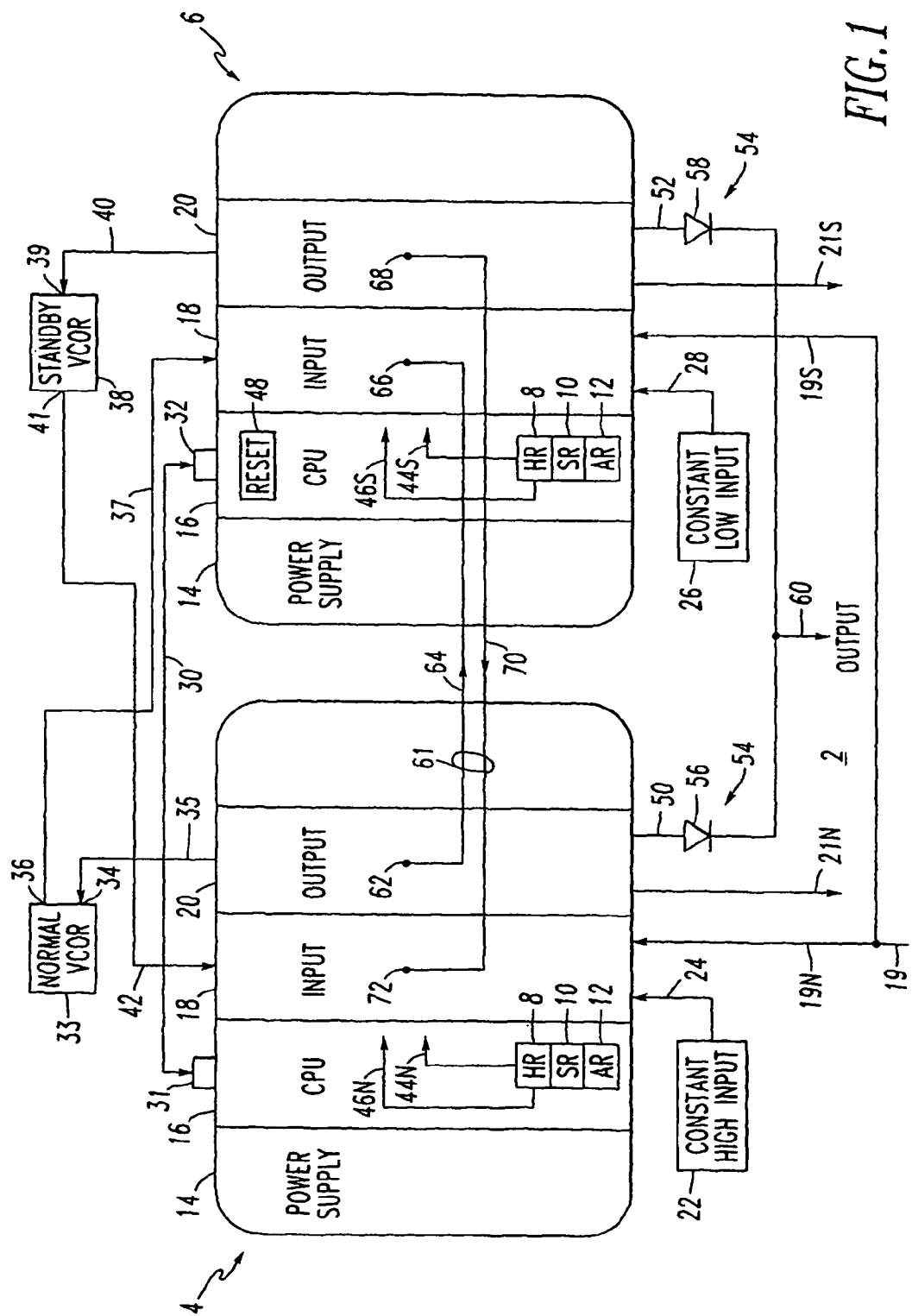
FIG. 1 is a block diagram of an interlocking control system including a normal processor and a standby processor in accordance with the present invention.

Referring to FIG. 1, an apparatus, such as an Interlocking Control System (ICS) 2, provides hot standby operation. The ICS 2 includes a normal processor unit 4 and a standby processor unit 6. In accordance with the present invention, the units 4,6 of the ICS 2 include a health routine (HR) 8, a synchronization routine (SR) 10, and an application routine (AR) 12. The unit 6 also includes a reset routine 48.

Each of the processor units 4,6 includes a power supply 14, a central processing unit (CPU) 16, one or more vital input boards 18 (only one is shown with each of the units 4,6) inputting a plurality of vital inputs 19, and one or more vital output boards 20 (only one is shown with each of the units 4,6) outputting a plurality of vital outputs 21N,21S, respectively. Preferably, all of the vital inputs 19N of the normal vital input board 18 are electrically interconnected with the vital inputs 19S of the standby vital input board 18. The normal state of the normal unit 4 is defined by a constant high input 22, which is applied to one of the normal vital inputs 24. The standby state of the standby unit 6 is defined by a constant low input 26, which is applied to one of the standby vital inputs 28.

A suitable communication channel 30 is provided for communicating between each of the normal and standby CPUs 16, which CPUs respectively include one or more communication ports 31 and 32 (only one communication port is shown with each of such CPUs). The normal unit 4 includes a normal vital cut off relay (VCOR) 33 including an input 34 controlled by one of its vital outputs 35 and an output 36 to one of the vital inputs 37 of the standby unit 6. The standby unit 6 includes a standby VCOR 38 including an input 39 controlled by one of its vital outputs 40 and an output 41 to one of the vital inputs 42 of the normal unit 4.

For each of the normal and standby units 4 and 6, the health routine 8 provides a health status 44N and 44S, respectively, after communication is established with the other one of such units through the communication channel 30. Also, the synchronization routine 10 for each of the normal and standby units 4 and 6 provides a synchronization status 46N and 46S, respectively, through the communication channel 30 with the other one of such units. The normal and standby application routines 12 output the vital outputs 21N and 21S through the vital output boards 20 when the synchronization status 46N and 46S is set and, also, input the vital inputs 19N and 19S, respectively, from the vital input boards 18 regardless of the state of the corresponding synchronization status.

The standby unit 6, which is determined as being standby whenever the vital input 28 (i.e., from the constant low input 26) of such unit is set low, also includes a reset routine 48, which resets the standby CPU 16. The normal unit 6 may include a reset routine (not shown), although that routine is disabled by the vital input 24 (i.e., from the constant high input 22).

As shown with the vital outputs 50,52, an output mechanism 54 (e.g., including diodes 56,58) is provided to output from some of the vital outputs of the normal unit 4 and from some of the vital outputs of the standby unit 6. The output mechanism 54 provides a common output 60 to a suitable output device (not shown). As discussed below, both of the units 4,6 are operating and capable of outputting through the output mechanism 54 to a single output device (not shown) for each pair of the vital outputs 50,52. The output mechanism 54 provides a vital OR circuit having a first input (i.e., the anode of diode 56) from the vital output 50 of the normal unit 4, a second input (i.e., the anode of diode 58) from vital output 52 of the standby unit 6, and an output (i.e., the common cathodes of diodes 56,58) adapted for electrical connection to a single output device (not shown).

In addition to the serial communication channel 30, an external, handwired synchronization mechanism 61 for exchanging normal and standby synchronization status may be applied between the normal and standby units 4 and 6. A vital output 62 of the normal unit 4 is electrically connected by a suitable conductor 64 to a vital input 66 of the standby unit 6. A vital output 68 of the standby unit 6 is electrically connected by a suitable conductor 70 to a vital input 72 of the normal unit 4.

EXAMPLE 2

There are three ways a vital Microlok®, such as the ICS 2 of FIG. 1, can communicate: serial communication to a non-vital Microlok® (not shown), serial communication between the normal/standby pair 4,6, and vital input and output boards 18,20. Since the communication to the non-vital Microlok® is by definition "non-vital", a breakdown in this communication will have no safety concerns. The serial communication between the normal/standby pair 4,6 utilizes a HEALTH bit (SL.OUT.HEALTH and SL.IN.HEALTH) that constantly monitors the serial link or channel 30. The vital input and output boards 18,20 are tied together. The inputs 19 to the vital input boards 18 are simply paralleled and the outputs 50,52 of the vital output boards 20 are "ORed" together with the diodes 56,58 (since both units 4,6 are preferably permitted to output at all times), or through some type of "Vital OR Gate" (if the user desires the standby unit 6 to suppress its outputs 21S). This means that barring a broken wire (which would result in a failsafe condition), both units 4 and 6 will receive the same inputs 19 and, since they have the same logic equations, produce the same outputs 21N,50 and 21S,52, respectively. Additional information on the outputs 21N,21S, 50,52 is provided under the heading Outputs, below.

The application software or routine 12 addresses the hot standby issue with the above in mind. There is no attempt to actively synchronize all bits at all times, and there is no suppression of the outputs 21N,21S,50,52 from either unit 4,6 until a failure or disagreement is detected (although it is possible to suppress the standby outputs 21S,52 if desired by the user). If the outputs of the standby unit 6 are optionally suppressed, then a transfer from the normal unit 4 to the standby unit 6 would occur in a relatively short time, although the transfer would not necessarily be "hot standby". Since the only purpose of the standby unit 6 is to provide a hardware backup for the normal unit 4, the normal unit 4 is considered "boss". If there is a disagreement between the two units 4,6, then the normal unit 4 will always reset the standby unit 6, or the standby unit 6 will reset itself, but the standby unit 6 can never reset the normal unit 4. This is necessary since there is no way of determining which unit 4,6 is correct, but only that they are not in agreement. The only way the normal unit 4 will shut down leaving the standby unit 6 in control is if the normal unit 4 senses an internal failure and takes itself offline. Also, if either unit 4 or 6 is reset, then all of its outputs 21N,50 or 21S,52 are suppressed until they are verified to be in synchronization with the unit currently online.

Preferably, both units 4,6 are permitted to output at all times, in order to provide hot standby operation, and in order to detect a shorted diode 56,58 (FIG. 2) from the respective units 4,6, when the outputs of such units are both high. Preferably, the vital output boards 20 include suitable circuitry (not shown), which periodically outputs a low pulse of suitable duration when the corresponding vital output is high, and which periodically outputs a high pulse of suitable duration when the corresponding vital output is low. That circuitry, in turn, monitors the corresponding vital output, in order to verify that the low pulse goes low and that the high pulse goes high. If, for example, the diode 58 of the standby unit 6 is shorted when the standby output 52 is high, then the low pulse from the standby unit 6 would not occur at the common output 60 since the normal output 50 is high and, thus, the common output 60 is driven high. In that manner, for example, the standby unit 6 detects the shorted diode 58, when the outputs of the units 4,6 are both high.

Since each unit 4,6 is wired and programmed virtually identical as it would be if it were a stand-alone unit, this system 2 is very easy to implement. The only modifications needed to produce the hot standby feature are slight modifications in the hardware (e.g., vital inputs, vital outputs, serial communication, vital cut off relay (VCOR) verification and Normal unit bit) and application program.

Inputs

Assuming both units 4,6 are housed by the same rack (not shown), all inputs 19 are single runs to the rack (e.g., most likely to a weidmuller). The inputs 19 are then fed in parallel to each unit 4,6.

Outputs

Figure 2:
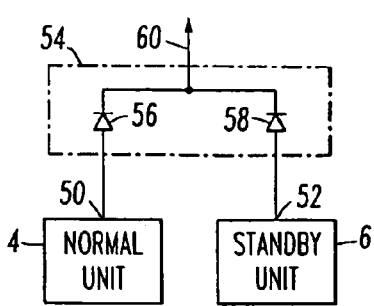
FIG. 2 is a schematic diagram of an OR circuit including a pair of diodes for the normal and standby processors of FIG. 1, in which both units actively produce outputs at all times.
Figure 3:
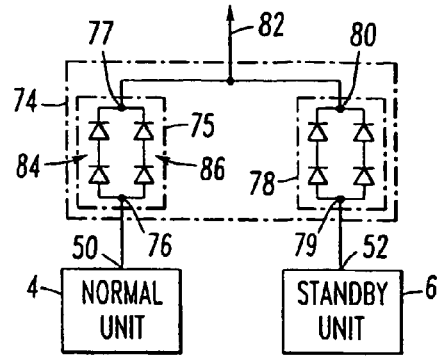
FIG. 3 is a schematic diagram of an OR circuit including a pair of diode arrays for the normal and standby processors of FIG. 1, in which both units actively produce outputs at all times.

With both units 4,6 actively producing outputs 21N,50, 21S,52 at all times, the outputs, such as 50 and 52, need only be "ORed" together through the pair of diodes 56 and 58 (FIG. 2), or through a series of diodes 75 and 78 (e.g., needed to meet relatively more stringent reliability specifications) (FIG. 3). As shown in FIG. 3, an improved reliability output configuration (as compared to the output mechanism 54 of FIGS. 1 and 2), includes a first diode array 75 having an input 76 and an output 77 and a second diode array 78 having an input 79 and an output 80. The outputs 77,80 of the first and second diode arrays 75,78, respectively, are adapted for electrical connection at 82 to a single output device (not shown). The input 76 of the first diode array 75 is electrically connected to the vital output 50 of the normal unit 4 of FIG. 1. The input 79 of the second diode array 78 is electrically connected to the vital output 52 of the standby unit 6 of FIG. 1.

As shown with the first diode array 75, each of the arrays 75,78 includes a first pair 84 of series-connected diodes and a second pair 86 of series-connected diodes. The first pair 84 are electrically connected in parallel with the second pair 86. The first and second pairs 84,86 have a pair of anodes as the input 76 of the corresponding diode array 75. The first and second pairs 84,86 have a pair of cathodes as the output 77 of the corresponding diode array 75.

However, the diodes of FIGS. 2 and 3 cannot be used if the user requires that the outputs of the standby unit 6 be suppressed if the normal unit 4 is online. The reason for this is that although a Microlok® can reliably detect a shorted diode when both units 4,6 are active, it cannot reliably detect a shorted diode on the normal unit 4 if the standby unit 6 is not producing outputs (see Scenarios 8 and 9 of Tables 8 and 9, respectively, below). If the outputs 52 of the standby unit 6 are suppressed, then the outputs 50,52 must be "ORed" through some type of "Vital OR Gate" (not shown) which will not allow the possibility of shorting. Union Switch & Signal's Isolation Module can serve this purpose, but it is not cost effective. Alternatively, a scaled down version (not shown) could be developed which would provide the necessary protection and be smaller and less expensive.

Serial Communication

Continuing to refer to FIG. 1, two vital serial communications ports (e.g., COM1 and COM2) (only single ports 31,32 are shown) are utilized on each unit 4,6. This still leaves either two non-vital or one vital and one non-vital port (e.g., COM3 (not shown) can be set up as either vital or non-vital) for links to other units (not shown). It is possible to implement the system 2 using only one communication port of each unit 4,6, but that would require a variation in the application program in each unit. This can easily be accomplished, but it is unnecessary unless more than two communication ports are required for links to other units.

VCOR Verification

In order to constantly monitor the condition of the other unit, each of the units 4,6 must have a front contact 41,36 of the other unit's VCOR relay 38,33 connected to an input 42,37, respectively, of one of its vital input boards, such as 18.

Normal Unit Bit

Since the same application program, such as 12, is uploaded into both of the units 4,6, each of such units must have one input 24,28, respectively, that is used for identification. This input 24 (e.g., on vital input board 18) must be constantly high in the normal unit 4 and constantly low in the standby unit 6. The application routine 12 uses these constant bit states (Normal—high, Standby—low) in portions of the assign statements, as discussed below, that require different operating characteristics for the normal unit 4 than for the standby unit 6.

Application Program

Any application program designed for a stand-alone unit (not shown), such as one of units 4,6, can be changed to a hot standby application simply by adding three logic systems and modifying all output bits to be one of three types. Also, if external Lock relays (not shown) are not utilized, then the internal Lock bits must be modified as if they were outputs.

Logic Systems

The three logic systems: (1) Synchronization 10, (2) Health 8, and (3) Reset 48 serve to restrict, maintain, and protect the operation of the hot standby system. More detailed explanations of the bits that comprise these systems can be found in the example test programs in the Appendices.

Synchronization

The Synchronization system of synchronization routine 10 restricts the corresponding unit 4,6 from producing outputs 50,52 if the other unit 6,4, respectively, is already online and the output states of the units 4,6 disagree. Once the corresponding unit achieves synchronization, it is permitted to produce its corresponding vital outputs 50,52 and the synchronization routine 10 is not utilized until the unit is reset and attempts to come back on line. This system is equally functional in both the normal and standby units 4,6.

The synchronization routine 10 employs the following bits:

STAND.ALONE.SYNC.DELAY is a slow set bit (e.g., a suitable delay is provided before setting the bit; no delay is provided before clearing the bit) that provides a 1 second delay for the corresponding unit 4,6 to stabilize before the other unit's VCOR 38,33, respectively, is referenced.

STAND.ALONE.SYNC sets the SYNC bit, below, or synchronization status 46N,46S if STAND.ALONE.SYNC.DELAY is set and the other unit's VCOR 38,33, respectively, is down.

SYNC.WAIT is a slow set bit which forces the unit 4,6 coming online to wait until serial communication is stabilized over the communication channel 30 before attempting to synchronize.

SYNC is the controlling bit. When the unit 4,6 coming online is synchronized with the other unit currently online the SYNC bit is set.

Health

The Health system of health routine 8 is verified by the constant exchange of the HEALTH bit over the serial communication channel 30. When the normal unit's VCOR 33 is picked, the HEALTH bit is required for the standby unit 6 to stay online. Without the HEALTH bit verifying that serial communication is stable, the standby unit 6 is reset by its reset routine 48. This ensures that if communication is lost, one unit (i.e., the standby unit 6) is taken offline. Though this system is primarily utilized in the standby portions of the assign statements, as discussed below, the normal unit 4 also uses a HEALTH.WAIT bit to maintain its Restricted bits, as discussed below, while the standby unit 6 is coming online.

The health routine 8 employs the following bits:

HEALTH.WAIT.DELAY is a slow clear bit (e.g., a suitable delay is provided before clearing the bit; no delay is provided before setting the bit) that is set when the other unit's VCOR 38,33 is picked but serial communication is not yet established over the communication channel 30. The function of this bit is to set HEALTH.WAIT, below, and maintain it until either SL.IN.HEALTH, below, is received from the other unit or time expires.

HEALTH.WAIT is a slow set bit that sets 1 second after HEALTH.WAIT.DELAY. This bit clears when SL.IN.HEALTH is received from the other unit or time expires and HEALTH.WAIT.DELAY clears.

SL.OUT.HEALTH is the serial bit that the unit 4,6 sends to the other unit, 6,4, respectively.

SL.IN.HEALTH is the serial bit that the unit 4,6 receives from the other unit 6,4, respectively.

Reset

The Reset system of standby reset routine 48 protects the pair's vital functions by forcing the standby unit 6 to reset when there is a disagreement between the units 4,6. This system is always active in the standby unit 6 if the normal unit's VCOR 33 is picked.

The reset routine 48 employs the following bits:

SYS.RESET is a slow set bit that is only operational in the standby unit 6. When this bit sets, the standby unit 6 resets.

SL.OUT.RESET is sent (e.g., over the communication channel 30) from the normal unit 4 to the standby unit 6 when the normal unit 4 determines there is a disagreement and wants the standby unit 6 to reset.

SL.IN.RESET is the bit the standby unit 6 receives over the communication channel 30 when the normal unit 4 sends SL.OUT.RESET.

GROUP.XX.RESET type bits are groups of individual reset bits that are used to simplify the SYS.RESET assign statement in the application routine 12 and eliminate the need for timers on all individual reset bits.

Bit Types

There are three types of bits: Unrestricted, Half Restricted, and Restricted. All three of these types may be utilized to ensure that the hot standby operates safely, but does not waste system resources on unnecessary tasks.

These three types of bits have the following in common: (1) if the other unit's VCOR 38,33 is down, then the unit 4,6, respectively, will produce the output 50,52 whenever the assign statement is satisfied; (2) if the other unit's VCOR 38,33 is up, then the unit 4,6, respectively, must also receive serial communication over the communication channel 30, (a) Unrestricted bits require a generic health bit, (b) Half Restricted bits require a bit verification from the normal unit 4 to the standby unit 6, and (c) Restricted bits require bit verification to and from both units 4,6; (3) if the other unit 4,6 is in control, then the unit 6,4 being brought online cannot produce any outputs 52,50, respectively, until it is in SYNC; and (4) if both units 4,6 are online and any bit states disagree for a selected period of time, then either the normal unit 4 will reset the standby unit 6 or the standby unit 6 will reset itself.

Alternatively, with minor optional modifications, the standby unit's outputs 21S,52 can be suppressed, for example, when the normal unit's VCOR 33 is picked.

Unrestricted

These bits require no bit specific serial communication between the units 4,6 in order to produce an output, such as 21N,21S,50,52; therefore, they are the fastest and should always be utilized whenever possible. These bits should never be used for signal lighting or Locks.

Half Restricted

These bits are unrestricted in the normal unit 4, but restricted in the standby unit 6. The standby unit 6 cannot produce the output 21S,52 until it receives verification (via serial communication over the communication channel 30) that the normal unit 4 has also satisfied the assign statement. This type of bit is specifically designed for signal lighting. If these bits are out of sync, then it can only be that the normal unit 4 has the aspect lit and the standby unit 6 does not. In this event, the standby unit 6 is reset, and the signal aspect does not change.

Restricted

These bits are restricted in both the normal and the standby units 4,6. Neither unit 4,6 can produce the output 50,52 until it receives verification (via serial communication over the communication channel 30) that the other unit 6,4, respectively, has also satisfied the assign statement. This type of bit is the slowest due to the amount of serial communication involved. It is specifically designed for Locks. The bit cannot be set (unlocked) until both units 4,6 satisfy the assign statement and it will be cleared (locked) immediately at any time the units 4,6 do not agree. There are two considerations concerning this type of bit: (1) if locking is performed without the use of external Lock relays, then the internal variables will require this configuration; and (2) if the response time is too long due to the use of serial communication, then the verification will need to be passed via vital input and output boards 18,20.

EXAMPLE 3

Both units 4,6 were housed in a cabinet and shared the same (not shown) power supply, such as 14. The serial communication between the units 4,6 was accomplished with a cable 30 from the normal CPU 16 to the standby CPU 16. The communication cable 30 tied normal COM1 to standby COM2, and normal COM2 to standby COM1 (only single communication ports 31,32 are shown in FIG. 1). Inputs 19 were paralleled to both units 4,6, but the wires going to the standby unit 6 were clipped together and could be disconnected. The outputs 50,52 were "ORed" together with diodes 56,58, respectively, as shown in the basic configuration example of FIGS. 1 and 2.

Both units 4,6 were uploaded with an application program 12.

The following references were used for testing purposes: (1) "VCOR picked" was referenced from the lighting of the VCOR indication on the power supply board 14; (2) serial communication was referenced from the COM indications (A,B,C,D, and E) on the CPU board 16; (3) outputs were referenced from the indications on the vital output board 20; and (4) for the purpose of testing, the following reference bits were not considered to be vital outputs: OUT 7—SYNC.WAIT, OUT 8—SYNC, OUT 9—HEALTH.WAIT.DELAY, OUT 10—HEALTH.WAIT, OUT 12—SL.OUT.04, OUT 13—SL.IN.04, OUT 14—OUT.RESET, OUT 15—IN.RESET, and OUT 16—COMALT.

Tables 1-9, below, show different test scenarios for Example 3, above.

TABLE 1

| | |
|---|---|
| Scenario 1 | Unit RESET while the other unit is offline (CPU pulled) |
| Purpose | To verify that each unit can operate as a stand-alone unit |
| Attempts | 5 (for each unit) |
| Result | Unit came online and produced outputs:<br>Time from RESET to picking of VCOR = 14 sec.<br>Time from RESET to outputs = 15 sec.<br>Time from RESET to attempted serial communication = 25 sec. |
| Comment | The times were the same for both the normal and standby units |

TABLE 2

| | |
|---|---|
| Scenario 2 | Unit RESET while the other is online, communicating, and producing outputs |
| Purpose | To verify that each unit can be brought online without any interruption of controlling unit |
| Attempts | 5 (for each unit) |
| Result | Unit came online and produced outputs:<br>Time from RESET to picking of VCOR = 14 sec.<br>Time from RESET to serial communication = 25 sec.<br>Time from RESET to outputs = 30 sec. |
| Comment | The times were the same for both the normal and standby units<br>No change in outputs occurred in the other unit |

TABLE 3

| | |
|---|---|
| Scenario 3 | Power up both units simultaneously |
| Purpose | To verify that there is no circular logic, which would prevent the units from coming online simultaneously |
| Attempts | 5 |
| Result | Both units powered up and produced outputs:<br>Time from power to picking of VCOR = 18 sec.<br>Time from power to serial communication = 29 sec.<br>Time from power to both unit's outputs = 35 sec. |
| Comment | This functioned as expected<br>No interruption of outputs occurred in either unit |

TABLE 4

| | |
|---|---|
| Scenario 4 | Both units online<br>Remove IN.02 bit from the standby unit |
| Purpose | To prove that the normal unit will RESET the standby unit if there is a disagreement in bit states, and that there is no danger in allowing the standby unit to attempt to come back online after it is RESET |
| Attempts | 1 disconnect of input<br>Standby unit RESET 34 times<br>20 minutes time |
| Result | Standby unit RESET and continued to cycle:<br>Time from removal of input to first RESET = 10 sec.<br>Time from removal of input to first VCOR pick = 23 sec.<br>Time from removal of input to first establishment of serial communication with normal unit = 35 sec.<br>Time from removal of input to second RESET = 38 sec. |
| Comment | Standby unit continued to cycle, resetting every 15 seconds after the VCOR picked<br>The standby unit never produced any outputs<br>The normal unit's outputs were never interrupted<br>After approximately 30 minutes IN.02 was restored to standby unit and after the completion of its current reset, it came back online and produced outputs |

TABLE 5

| | |
|---|---|
| Scenario 5 | Both units online<br>Remove IN.02 bit from the standby unit<br>Reset normal unit<br>Wait 1 minute 30 seconds<br>Restore IN.02 bit to the standby unit |
| Purpose | To prove that the synchronization is required for the normal unit to come online if the standby unit is in control and that the normal unit cannot RESET the standby unit as the normal unit comes online |
| Attempts | 5 |
| Result | Normal unit did not produce outputs until after IN.02 was restored to the standby unit:<br>Time from RESET to VCOR pick = 14 sec.<br>Time from RESET to serial communication = 25 sec.<br>Time from RESET to IN.02 restored to standby unit = 1 min. 30 sec.<br>Time from RESET to output = 1 min. 30 sec. |

TABLE 6

| | |
|---|---|
| Scenario 6 | Both units online<br>RESET unit while IN.02 and IN.04 are constantly toggled (approximately 4 times a second) |
| Purpose | To prove that the flashing bits or several bits changing state will not hinder the unit from synchronizing and coming online |
| Attempts | 5 (for each unit) |
| Result | Both units came online in the usual timeframe |
| Comment | The controlling unit's outputs were never interrupted |

TABLE 7

| | |
|---|---|
| Scenario 7 | Both units online<br>Remove OUT.02 and OUT.04 set, and bit OUT.03 clear<br>Reset unit<br>Wait 5 seconds<br>RESET other unit |
| Purpose | To prove that either unit will produce outputs immediately if the other unit's VCOR is down |
| Attempts | 5 (for each unit) |
| Result | The unit RESET first came online and immediately produced outputs<br>The unit RESET second had to synchronize before it produced outputs |
| Comment | The controlling unit's outputs were never interrupted |

TABLE 8

| | |
|---|---|
| Scenario 8 | Both units online<br>Place a short across one output diode |
| Purpose | To prove that a shorted diode can be detected by the normal and standby units |
| Attempts | Twice on each diode of OUT.02, OUT.03 and OUT.04 with the outputs high<br>Twice on each diode of OUT.02, OUT.03 and OUT.04 with the outputs low<br>A total of 24 tests |
| Result | When the outputs were high, both units detected the short in 9-10 seconds and RESET<br>When the outputs were low the normal unit detected the short within 1 second and RESET<br>When the outputs were low the standby unit did not detect the short. All outputs were shorted for at least 1 minute and one was allowed to remain shorted for over 8 minutes and the unit still failed to detect it. After the elapsed time, the output was toggled high and the short was detected within 10 seconds. |
| Comment | The conclusion is that the normal and standby units can consistently detect a shorted diode within 10 seconds if both outputs are high<br>The unit without the shorted diode maintained its output without interruption<br>Since some properties would require the standby unit's outputs to be suppressed if the normal unit's VCOR is picked, the question still remains if the normal and standby units can detect a shorted diode if the outputs are not the same (both high or both low). See Scenario 9 (Table 9). |

TABLE 9

| | |
|---|---|
| Scenario 9 | Install modified program in both the normal and standby units, which program suppresses the standby unit's outputs if the normal unit's VCOR is picked<br>Bring both units online (the normal unit has outputs the standby unit does not)<br>Place a short across one output diode |
| Purpose | To determine if shorted diode can be detected by the normal and standby units if the outputs are not the same (both high or both low) |

TABLE 9-continued

| | |
|---|---|
| Attempts | Twice on each diode of OUT.02, OUT.03 and OUT.04 A total of 12 tests |
| Result | When the diode of the standby unit was shorted the standby unit detected the short within 1 second and RESET When a diode of the normal unit was shorted the normal unit did not detect the short. All outputs were shorted for at least 1 minute and one was allowed to remain shorted for over 8 minutes and the unit still failed to detect it. After the elapsed time, the normal unit was RESET and when it attempted to come back online (its outputs low and the standby unit's outputs high) it detected the short and continually RESET. |
| Comment | The conclusion is that the normal and standby units cannot detect a shorted diode when it is on the high output and the other output is low If the standby unit's outputs must be suppressed when the normal units VCOR is picked then diodes are not a viable option |

EXAMPLE 4

Tables 10 and 11, below, show the configuration of the normal and standby test units, respectively, of Example 3, above.

TABLE 10

NORMAL UNIT

| BOARD | SLOT | PART# | SERIAL # | REVISION |
|---|---|---|---|---|
| CPU | 18 | N17003401 | 1201028 | 2 |
| Vital Input - 16 | 13 | N17001001 | 0998048 | 2 |
| Vital Output - 16 | 15 | N17000501 | 0898006 | 2 |
| Power Supply | 6 | N16600301 | 1998022 | 4 |

TABLE 11

STANDBY UNIT

| BOARD | SLOT | PART# | SERIAL # | REVISION |
|---|---|---|---|---|
| CPU | 18 | N17001301 | 3100010 | 7 |
| Vital Input - 16 | 13 | N17001001 | 0998033 | 2 |
| Vital Output - 16 | 15 | N17000501 | 0898005 | 2 |
| Power Supply | 10 | N451810750 | 2498001 | 2 |

EXAMPLE 5

Figure 4:
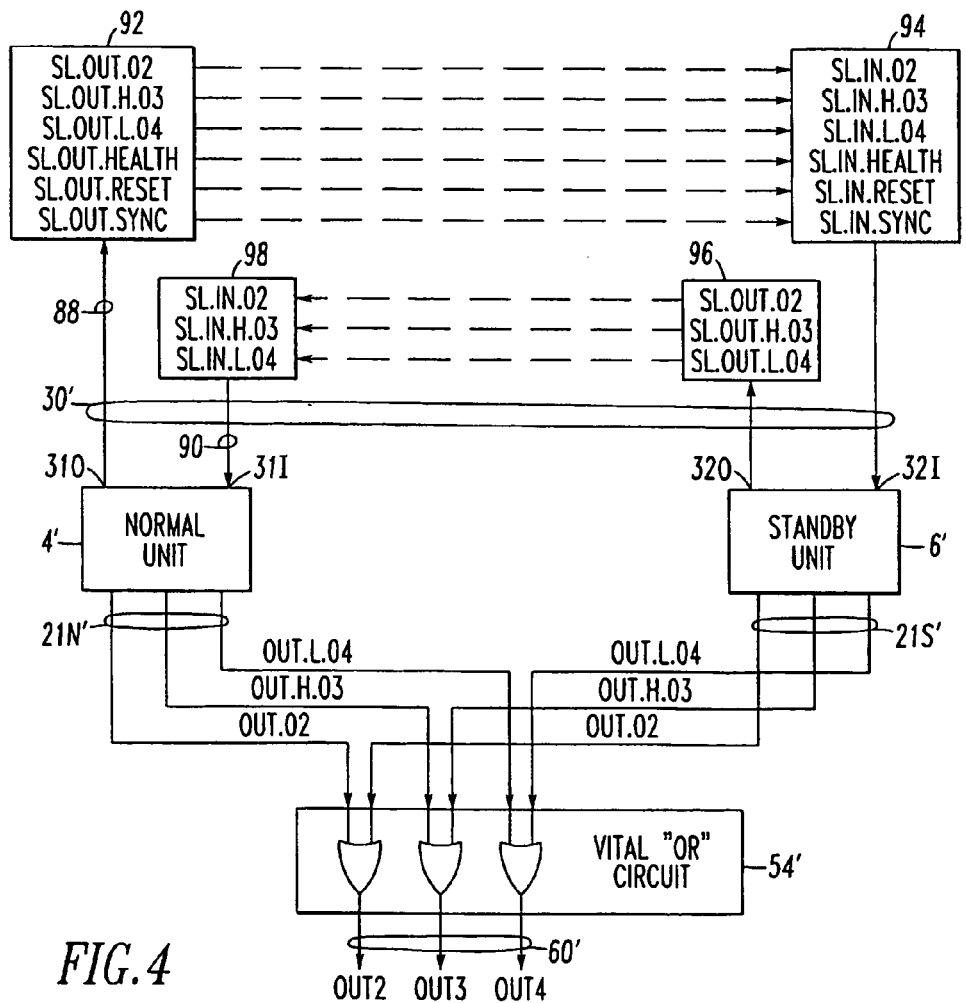
FIG. 4 is a flow diagram showing the signal interconnections between the normal and standby processors in accordance with an embodiment of the invention.

FIG. 4 shows the signal interconnections between two normal and standby units 4',6'. A vital "OR" circuit 54' outputs from the vital outputs 21N',21S' of respective normal and standby units 4',6'. These units 4' and 6' are similar to the units 4 and 6 of FIG. 1, except that they include two communication ports 31O and 31I, and 32O and 32I, respectively, as part of a communication channel 30'. In this example, there are three vital outputs, which are output by the assign statements (as shown in the Appendices) of the application routines 12 of the normal and standby units 4',6'. Although three vital outputs are shown for each unit, one, two or more than three vital outputs may be employed. The three vital outputs 21N',21S' include an Unrestricted output (OUT.02), a Half Restricted output (OUT.H.03) and a Restricted output (OUT.L.04). The assign statements qualify these outputs by employing the normal and standby states of such units 4' and 6', as defined by the constant high (normal) input 22 and the constant low (standby) input 26, respectively, of FIG. 1. In turn, the vital "OR" circuit 54' outputs three vital outputs 60' (OUT2, OUT3, OUT4) to three corresponding output devices (not shown).

With respect to the normal unit 4', an output communication path 88 from the normal unit 4' to the standby unit 6' is provided by the normal output communication port 31O and the standby input communication port 32I. Also, an input communication path 90 to the normal unit 4' from the standby unit 6' is provided by the standby output communication port 32O and the normal input communication port 31I. The routines 8,10,12 (FIG. 1) of the normal unit 4' output six bits 92 (SL.OUT.02, SL.OUT.H.03, SL.OUT.L.04, SL.OUT.HEALTH, SL.OUT.RESET, SL.OUT.SYNC), which bits 92 are input as bits 94 (SL.IN.02, SL.IN.H.03, SL.IN.L.04, SL.IN.HEALTH, SL.IN.RESET, SL.IN.SYNC) by the routines 8,10,12,48 (FIG. 1) of the standby unit 6'. In a similar manner, the routines 8,10,12 of the standby unit 6' output three bits 96 (SL.OUT.02, SL.OUT.H.03, SL.OUT.L.04), which bits 96 are input as bits 98 (SL.IN.02, SL.IN.H.03, SL.IN.L.04) by the routines 8,10,12 of the normal unit 4'.

The hot standby method and apparatus disclosed herein is organized in such a way that it can easily be incorporated into any Microlok® application program, such as application routine 12, in order to produce a hot standby.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An apparatus for providing hot standby operation, said apparatus comprising:
   a normal processor;
   a standby processor;
   each of said normal and standby processors comprising:
      a plurality of vital inputs, at least some of said vital inputs being electrically interconnected with at least some of said vital inputs of the other one of said standby and normal processors,
      a plurality of vital outputs,
      means for communicating with the other one of said standby and normal processors,
      a health routine providing a health status after communication is established with the other one of said standby and normal processors through said means for communicating,
      a vital relay including an input controlled by one of said vital outputs and an output to one of said vital inputs of the other one of said standby and normal processors,
      a synchronization routine providing a synchronization status through said means for communicating with the other one of said standby and normal processors, and
      an application routine outputting said vital outputs when said synchronization status is set and inputting said vital inputs;
   said standby processor further comprising a reset routine, which resets said standby processor when said health status of said standby processor is not provided; and
   means for outputting from some of said vital outputs of said normal processor and from some of said vital outputs of said standby processor.

2. The apparatus of claim 1 wherein said normal and standby processors operate in at least one mode selected from the group comprising:
- a first mode wherein both of said normal and standby processors output through at least one of said some of said vital outputs of said normal and standby processors, respectively, without restriction;
- a second mode wherein said normal processor outputs through at least one of said some of said vital outputs of said normal processor without restriction and said standby processor verifies through said means for communicating of said standby processor that said standby processor agrees with said normal processor before outputting through at least one of said some of said vital outputs of said standby processor and, otherwise, said standby processor being reset; and
- a third mode wherein both of said normal and standby processors verify through said means for communicating of said normal and standby processors, respectively, that said normal and standby processors, respectively, agree with said standby and normal processors, respectively, before outputting through at least one of said some of said vital outputs of said normal and standby processors, respectively, and, otherwise, said normal and standby processors being reset.

3. The apparatus of claim 2 wherein for said first mode the application routines of said normal and standby processors enable said some of said vital outputs of said normal and standby processors, respectively, if the output of said vital relay of said standby and normal processors, respectively, is set and if the health routine of said normal and standby processors, respectively, determines said health status.

4. The apparatus of claim 2 wherein for said second mode the application routine of said normal processor enables said some of said vital outputs of said normal processor if the output of said vital relay of said standby processor is set and if the health routine of said normal processor determines said health status.

5. The apparatus of claim 2 wherein for said second mode the application routine of said standby processor enables one of said some of said vital outputs of said standby processor if the output of said vital relay of said normal processor is set, if the health routine of said standby processor determines said health status, and if said standby processor verifies through said means for communicating of said standby processor that said one of said some of said vital outputs of said standby processor agrees with a corresponding one of said some of said vital outputs of said normal processor.

6. The apparatus of claim 2 wherein for said third mode the application routines of said normal and standby processors enable one of said some of said vital outputs of said normal and standby processors, respectively, if the output of said vital relay of said standby and normal processors, respectively, is set, and if the health routine of said normal and standby processors, respectively, determines said health status, and if said normal and standby processors verify through said means for communicating of said normal and standby processors, respectively, that said one of said some of said vital outputs of said normal and standby processors, respectively, agrees with said standby and normal processors, respectively.

7. The apparatus of claim 1 wherein both of said normal and standby processors operate in a mode in which said normal and standby processors output through at least one of said some of said vital outputs of said normal and standby processors, respectively, without restriction.

8. The apparatus of claim 1 wherein said normal and standby processors operate in modes wherein said normal processor outputs through at least one of said some of said vital outputs of said normal processor without restriction and said standby processor verifies through said means for communicating of said standby processor that said standby processor agrees with said normal processor before outputting through at least one of said some of said vital outputs of said standby processor and, otherwise, said standby processor being reset.

9. The apparatus of claim 8 wherein the application routine of said standby processor enables one of said some of said vital outputs of said standby processor if the health routine of said standby processor determines said health status and if said standby processor verifies through said means for communicating of said standby processor that said one of said some of said vital outputs of said standby processor agrees with a corresponding one of said some of said vital outputs of said normal processor.

10. The apparatus of claim 8 wherein said some of said vital outputs of said normal and standby processors include signal lighting outputs.

11. The apparatus of claim 1 wherein said normal and standby processors operate in mode wherein both of said normal and standby processors verify through said means for communicating of said normal and standby processors, respectively, that said normal and standby processors, respectively, agree with said standby and normal processors, respectively, before outputting through at least one of said some of said vital outputs of said normal and standby processors, respectively, and, otherwise, said normal and standby processors are reset.

12. The apparatus of claim 11 wherein said some of said vital outputs of said normal and standby processors include lock outputs.

13. The apparatus of claim 12 wherein said lock outputs include a first lock output and a second lock output; wherein the first lock output of said normal processor is in agreement with the first lock output of said standby processor; wherein both of said first lock outputs are set to an unlocked state; wherein the second lock output of said normal processor is not in agreement with second lock output of said standby processor; and wherein both of said second lock outputs are set to a locked state.

14. The apparatus of claim 12 wherein said lock outputs include a first lock output and a second lock output; wherein the first lock output of said normal processor is in agreement with the first lock output of said standby processor; wherein both of said first lock outputs are set to a locked state; wherein the second lock output of said normal processor is not in agreement with second lock output of said standby processor; and wherein both of said second lock outputs are set to a locked state.

15. The apparatus of claim 2 wherein both of said normal and standby processors are operating and capable of outputting through said means for outputting to a single output device.

16. The apparatus of claim 15 wherein said means for outputting includes a first diode having an anode and a cathode and a second diode having an anode and a cathode; wherein said cathodes are adapted for electrical connection to said single output device; wherein the anode of said first diode is electrically connected to one of said some of said vital outputs of said normal processor; and wherein the anode of said second diode is electrically connected to a corresponding one of said some of said vital outputs of said standby processor.

17. The apparatus of claim 15 wherein said means for outputting includes a first diode array having an input and an output and a second diode array having an input and an output; wherein said outputs of said first and second diode arrays are adapted for electrical connection to said single output device; wherein the input of said first diode array is electrically connected to one of said some of said vital outputs of said normal processor, and wherein the input of said second diode array is electrically connected to a corresponding one of said some of said vital outputs of said standby processor.

18. The apparatus of claim 17 wherein each of said first and second diode arrays includes a first pair of series-connected diodes and a second pair of series-connected diodes, said first pair of series-connected diodes being electrically connected in parallel with said second pair of series-connected diodes, said first and second pairs having a pair of anodes as the input of the corresponding one of said first and second diode arrays, said first and second pairs having a pair of cathodes as the output of the corresponding one of said first and second diode arrays.

19. The apparatus of claim 1 wherein said means for outputting includes a vital OR circuit having a first input from one of said some of said vital outputs of said normal processor, a second input from one of said some of said vital outputs of said standby processor, and an output adapted to output to a single output device.

20. The apparatus of claim 1 wherein said means for communicating includes at least one communication port adapted for communication with the other one of said standby and normal processors.

21. The apparatus of claim 20 wherein said at least one communication port is at least one serial communication port.

22. The apparatus of claim 21 wherein said at least one serial communication port includes an output serial communication port for outputting serial data from one of said standby and normal processors to the other of said standby and normal processors, and further includes an input serial communication port for inputting serial data from the other one of said standby and normal processors to said one of said standby and normal processors.

23. The apparatus of claim 1 wherein said normal and standby processors form an interlocking control system.

24. The apparatus of claim 1 wherein said health routine of said normal and standby processors periodically exchanges health information with said health routine of said standby and normal processors, respectively, in order to provide said health status when said one of said vital inputs of the other one of said standby and normal processors is set and said health information is periodically received.

25. The apparatus of claim 24 wherein said normal and standby processors operate in a mode wherein both of said normal and standby processors verify through said means for communicating of said normal and standby processors, respectively, that said normal and standby processors, respectively, agree with said standby and normal processors, respectively, before outputting through at least one of said some of said vital outputs of said normal and standby processors, respectively, and, otherwise, said normal and standby processors being reset; wherein the application routines of said normal and standby processors enable one of said some of said vital outputs of said normal and standby processors, respectively, if the output of said vital relay of said standby and normal processors, respectively, is set, and if the health routine of said normal and standby processors, respectively, determines said health status, and if said normal and standby processors verify through said means for communicating of said normal and standby processors, respectively, that said one of said some of said vital outputs of said normal and standby processors, respectively, agree with said standby and normal processors, respectively.

26. The apparatus of claim 24 wherein the health routine of said normal processor outputs a reset command to said standby processor whenever the input of said vital relay controlled by said one of said vital outputs of said normal processor is set and the synchronization routine of said normal processor loses said synchronization status; and wherein said reset routine of said standby processor employs said reset command to reset said standby processor.

27. The apparatus of claim 26 wherein said reset routine of said standby processor initially ignores said reset command when said synchronization status is not set.

28. The apparatus of claim 1 wherein said application routine outputs said vital outputs: (a) when said one of said vital inputs of the other one of said standby and normal processors is not set; and (b) when said one of said vital inputs of the other one of said standby and normal processors is set and said synchronization status is set.

29. The apparatus of claim 1 wherein said one of said vital inputs of both of said normal and standby processors is set; wherein said standby processor verifies through said means for communicating of said standby processor that said standby processor disagrees with said normal processor before outputting through at least one of said some of said vital outputs of said standby processor; and wherein said reset routine of said standby processor resets said standby processor.

30. The apparatus of claim 1 wherein said one of said vital inputs of both of said normal and standby processors is set; wherein said normal processor verifies through said means for communicating of said normal processor that said standby processor disagrees with said normal processor before outputting through at least one of said some of said vital outputs of said normal processor; and wherein said reset routine of said normal processor outputs a reset command through said means for communicating of said normal processor to reset said standby processor.

31. The apparatus of claim 1 wherein said synchronization routine of said normal and standby processors sets said synchronization status when said one of said vital inputs of the other one of said standby and normal processors, respectively, is set, and when said normal and standby processors, respectively, verifies through said means for communicating that said one of said some of said vital outputs of said normal and standby processors, respectively, agrees with the corresponding one of said some of said vital outputs of said standby and normal processors, respectively.

32. The apparatus of claim 1 wherein when said synchronization status of one of said standby and normal processors is not set, when said one of said vital inputs of the other one of said standby and normal processors is set, and when said one of said normal and standby processors, respectively, verifies through said means for communicating of said normal and standby processors, respectively, that said standby processor disagrees with said normal processor, said at least one of said some of said vital outputs is disabled.

33. A hot standby method comprising:
  employing a normal processor;
  employing a standby processor;
  with each of said normal and standby processors:
    employing a plurality of vital inputs,
    electrically interconnecting at least some of said vital inputs with at least some of said vital inputs of the other one of said standby and normal processors,
    employing a plurality of vital outputs, communicating with the other one of said standby and
normal processors,
providing a health status after communication is established with the other one of said standby and normal processors,
employing a vital relay including an input controlled by one of said vital outputs and an output to one of said vital inputs of the other one of said standby and normal processors,
providing a synchronization status associated with said communicating with the other one of said standby and normal processors, and
employing an application routine for outputting said vital outputs when said synchronization status is set and inputting said vital inputs;
employing with said standby processor a reset routine, which resets said standby processor when said health status of said standby processor is not provided; and
outputting from some of said vital outputs of said normal processor and from some of said vital outputs of said standby processor.

34. The method of claim 33 further comprising
operating said normal and standby processors in a mode wherein both of said normal and standby processors output through at least one of said some of said vital outputs of said normal and standby processors, respectively, without restriction; and
enabling said some of said vital outputs of said normal and standby processors, respectively, if the output of said vital relay of said standby and normal processors, respectively, is set and if said normal and standby processors, respectively, determine said health status.

35. The method of claim 33 further comprising
operating said normal processor in a mode to output through at least one of said some of said vital outputs of said normal processor without restriction; and
operating said standby processor in a mode to verify through said communicating that said standby processor agrees with said normal processor before outputting through at least one of said some of said vital outputs of said standby processor and, otherwise, resetting said standby processor.

36. The method of claim 35 further comprising
enabling said some of said vital outputs of said normal processor if the output of said vital relay of said standby processor is set and if said normal processor determines said health status.

37. The method of claim 35 further comprising
enabling one of said some of said vital outputs of said standby processor if the output of said vital relay of said normal processor is set, if said standby processor determines said health status, and if said standby processor verifies through said communicating that said one of said some of said vital outputs of said standby processor agrees with a corresponding one of said some of said vital outputs of said normal processor.

38. The method of claim 33 further comprising
operating said normal and standby processors in a mode wherein both of said normal and standby processors verify through said communicating that said normal and standby processors, respectively, agree with said standby and normal processors, respectively, before outputting through at least one of said some of said vital outputs of said normal and standby processors, respectively, and, otherwise, resetting said normal and standby processors.

39. The method of claim 38 further comprising
enabling one of said some of said vital outputs of said normal and standby processors, respectively, if the output of said vital relay of said standby and normal processors, respectively, is set, and if said normal and standby processors, respectively, determine said health status, and if said normal and standby processors verify through said communicating that said one of said some of said vital outputs of said normal and standby processors, respectively, agrees with said standby and normal processors, respectively.

40. The method of claim 33 further comprising
operating said normal and standby processors in a mode wherein both of said normal and standby processors verify through said communicating that said normal and standby processors, respectively, agree with said standby and normal processors, respectively, before outputting through at least one of said some of said vital outputs of said normal and standby processors, respectively, and, otherwise, resetting said normal and standby processors.

41. The method of claim 33 further comprising
employing a vital OR circuit having a first input from one of said some of said vital outputs of said normal processor, a second input from one of said some of said vital outputs of said standby processor, and an output adapted to output to a single output device.

42. The method of claim 33 further comprising
forming an interlocking control system with said normal and standby processors.

43. The method of claim 33 further comprising
periodically exchanging health information between said standby and normal processors, respectively, in order to provide said health status when said one of said vital inputs of the other one of said standby and normal processors is set and said health information is periodically received.

44. The method of claim 43 further comprising
ignoring said reset command when said synchronization status is not set.

45. The method of claim 33 further comprising
outputting said vital outputs: (a) when said one of said vital inputs of the other one of said standby and normal processors is not set; and (b) when said one of said vital inputs of the other one of said standby and normal processors is set and said synchronization status is set.

46. The method of claim 33 further comprising
setting said one of said vital inputs of both of said normal and standby processors; and
verifying through said communicating that said standby processor disagrees with said normal processor before outputting through at least one of said some of said vital outputs of said standby processor, and responsively resetting said standby processor.

47. A method for providing normal and standby processors, said method comprising:
employing a normal processor;
employing a standby processor;
with each of said normal and standby processors:
employing a plurality of vital inputs,
electrically interconnecting at least some of said vital inputs with at least some of said vital inputs of the other one of said standby and normal processors,
employing a plurality of vital outputs,
communicating with the other one of said standby and normal processors, providing a health status after communication is established with the other one of said standby and normal processors, employing a vital relay including an input controlled by one of said vital outputs and an output to one of said vital inputs of the other one of said standby and normal processors, providing a synchronization status associated with said communicating with the other one of said standby and normal processors, and employing an application routine for outputting said vital outputs when said synchronization status is set and inputting said vital inputs;

employing with said standby processor a reset routine, which resets said standby processor when said health status of said standby processor is not provided;

outputting from some of said vital outputs of said normal processor and from some of said vital outputs of said standby processor; and disabling said some of said vital outputs of said standby processor if the output of said vital relay of said normal processor is set.

\* \* \* \* \*